Jan. 15, 1935. M. H. ROBERTS 1,987,975
LOCOMOTIVE BOOSTER MOTOR
Filed May 20, 1932 2 Sheets-Sheet 1

INVENTOR
Montague H. Roberts
BY
Synnestvedt + Lechner
ATTORNEYS

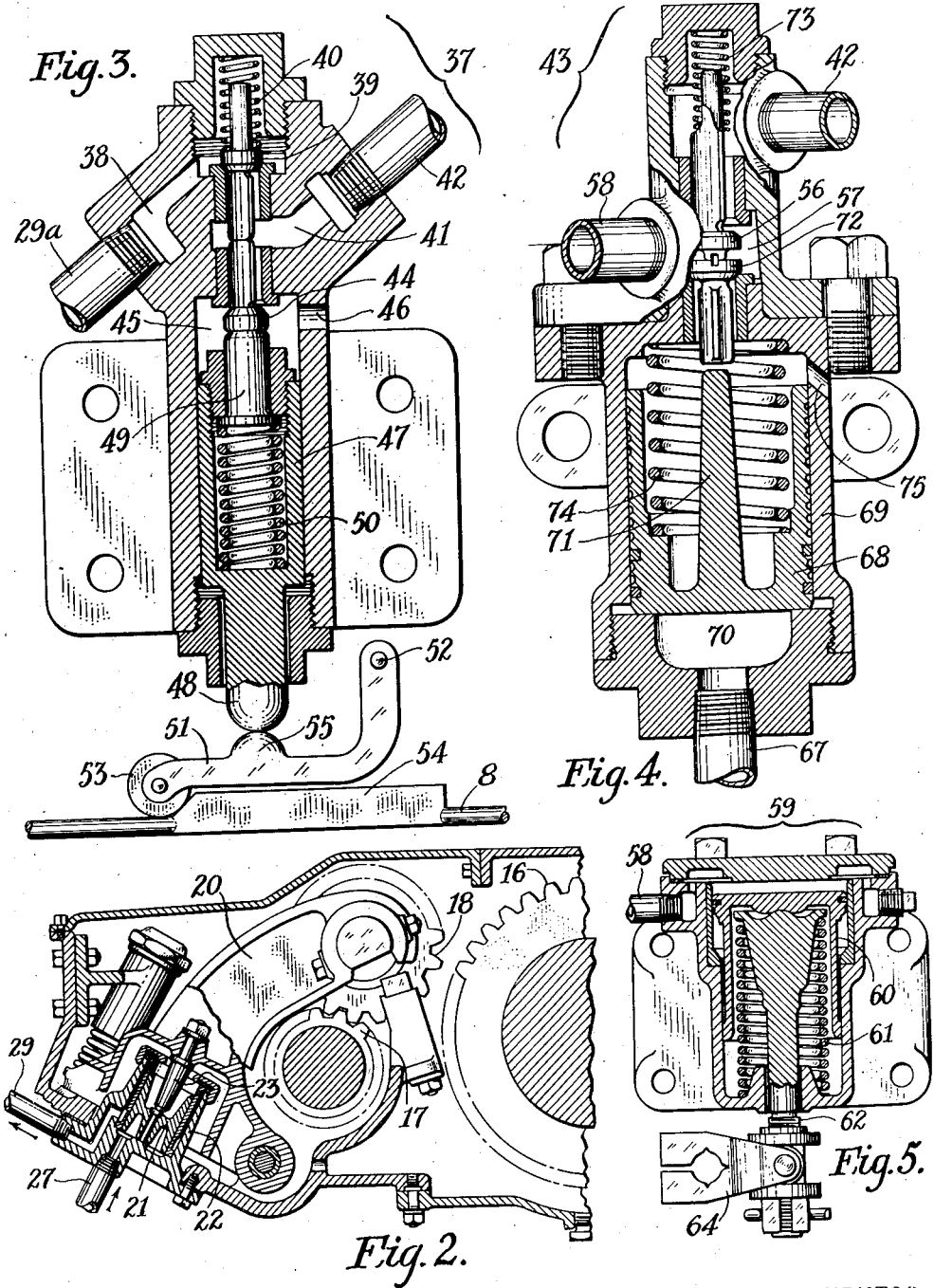

Patented Jan. 15, 1935

1,987,975

UNITED STATES PATENT OFFICE 1,987,975

LOCOMOTIVE BOOSTER MOTOR

Montague H. Roberts, Englewood, N. J., assignor to Franklin Railway Supply Company, New York, N. Y., a corporation of Delaware Application May 20, 1932, Serial No. 612,509

8 Claims. (Cl. 105—48)

This invention relates to locomotive booster motors and is especially concerned with the provision of certain controlling apparatus for preventing the occurrence of certain conditions which might otherwise occur when the main locomotive drivers or the wheels to which the booster motor is coupled slip, for example, when making a difficult start.

For a thorough understanding of the novel features herein presented, it should first be borne in mind that when the main drivers of the locomotive slip, it is customary to substantially or completely close the main locomotive throttle and thus shut off the supply of steam to the cylinders. After this operation, the throttle may again be opened either in making a new start or just before the forward speed has been lost, after which the driving will be resumed. In accordance with present practice, furthermore, the supply of steam for the booster motor is preferably conducted through a branch pipe tapped into the main steam supply line which is extended from the main throttle, and the booster supply, therefore, is also controlled by the main locomotive throttle. It is also to be observed that with the booster motor and its controlling system arranged in accordance with more or less standard practice, a material reduction in pressure in the booster supply line automatically tends to disentrain the booster motor gearing and thus to throw the motor completely out of operation. At times, therefore, when the main throttle was closed to correct for slipping of the main drivers, the pressure in the booster supply line has heretofore dropped to a point sufficiently low to cause disentrainment of the booster motor before the main throttle is again opened.

With the foregoing in mind, this invention has in view the provision of a controlling system for the booster motor, the said system being coupled with the main throttle control in such manner as to provide for the trapping of at least a certain amount of steam within the booster branch supply pipe, in order to prevent reduction of the pressure to a point which would cause disentrainment of the booster motor.

The foregoing, together with other more or less detailed objects and advantages, will appear more fully from a consideration of the following description making reference to the accompanying drawings, in which Figure 1 is a diagrammatic view of a locomotive main throttle control, a main cylinder for the locomotive, a booster motor and a controlling and actuating system constructed in accordance with this invention;

Figure 2 is a fragmentary vertical sectional view of certain portions of the booster motor;

Figures 3 and 4 are vertical sectional views through certain valve devices which I prefer to employ; and Figure 5 is a sectional view of an actuating motor also employed in the system of Figure 1.

Figure 1:
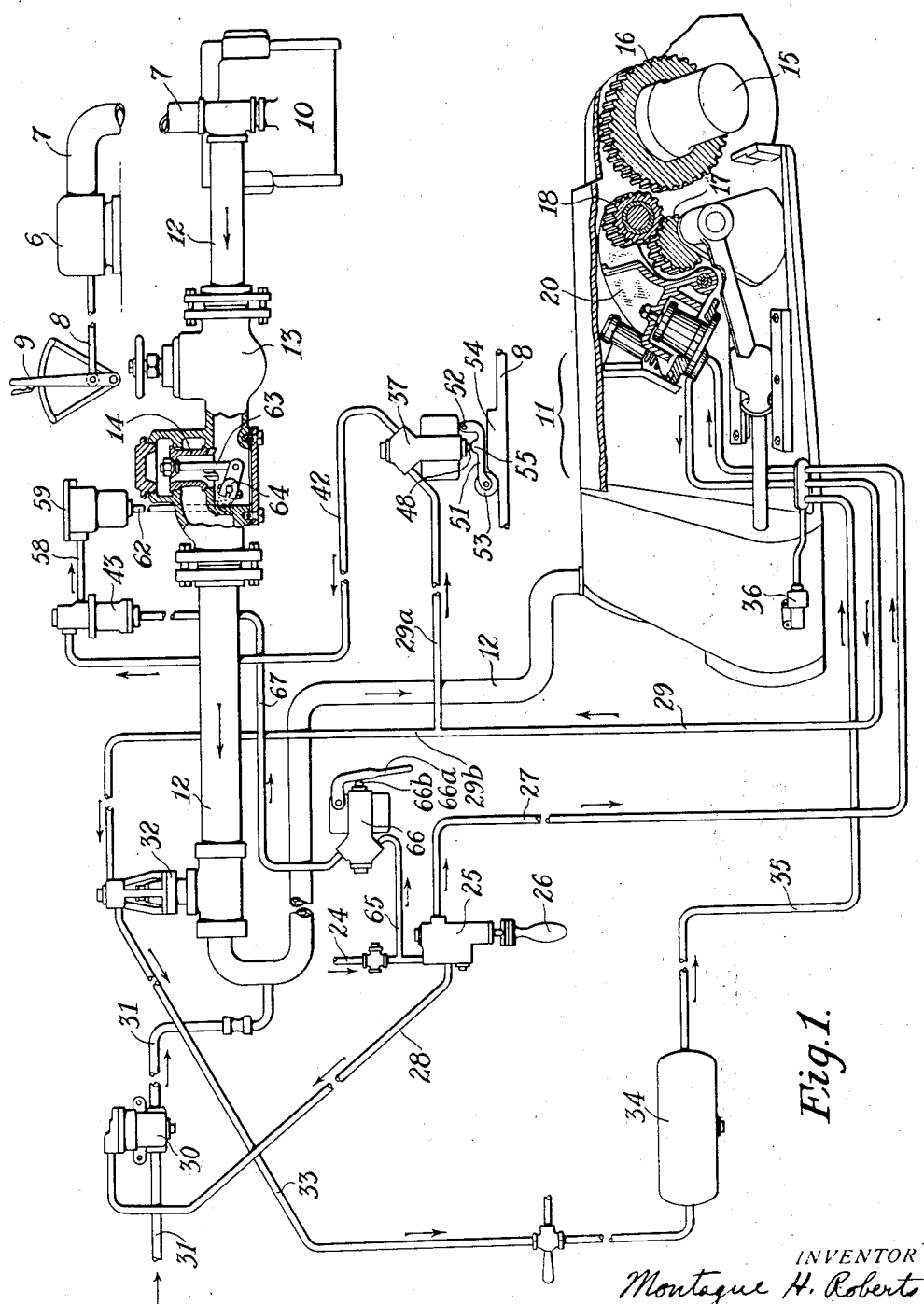

Referring in the first instance to Figures 1 and 2, the main locomotive throttle valve is indicated by the reference numeral 6, and this throttle valve is arranged to control the flow of steam through the main supply pipe 7. The main throttle operating rod is shown at 8 (a portion thereof being broken away), while the lever for actuating the same is indicated at 9.

As clearly seen in Figure 1, the supply pipe 7 is extended from the throttle valve to the cylinders of the engine for driving the main drivers, one of these cylinders being indicated at 10 in this view. The booster motor, generally indicated at 11, is supplied with operating steam through the branch pipe 12 tapped into the main supply pipe 7, and this branch is preferably equipped with a manually operable shut-off valve 13 and a booster throttle 14.

The booster motor itself is preferably coupled to an otherwise idle wheeled axle 15 and includes a gear 16 mounted on the axle, a driving gear 17 and an idler gear 18 mounted for rocking movement on a support 20 to provide for connection and disconnection of the gears 16 and 17. In order to actuate the rocker support 20 an entraining or actuating motor is provided and this motor includes (see Figure 2) a piston 21 working in a cylinder 22, the former being adapted to advance the idler gear by contact with a part 23.

As is now customary in this art, the booster motor is provided with a controlling system, the various parts of which are adapted to be actuated by some suitable fluid pressure such, for example, as air taken from the main air reservoir on the locomotive. Air from this reservoir is delivered through pipe 24 to the main control valve device 25 and a booster latch 26 is provided for actuating certain valves in this device to provide for the passage of air from the pipe 24 to the connection 27 as well as to the connection 28. The former of these two connections is extended (see Figures 1 and 2) to the entraining motor cylinder 22, and after the idler is advanced to connect the gears 16 and 17, the air admitted through the pipe 27 is by-passed and discharged through the pipe 29 for use in other parts of the apparatus to described hereinafter.

The connection 28 extending from the main control valve 25 transmits air pressure to the valve device 30 in order to open communication through the supplementary steam supply line 31, which discharges into the booster supply line 12 between the booster throttle 14 and the cylinders. While this particular portion of the apparatus is not a part of the present invention per se, it might here be noted that the auxiliary supply of steam may be derived from any suitable source and is provided and controlled in the manner above set forth in order that sufficient steam will be supplied to the booster cylinders for idling purposes. This ensures proper entrainment of the gearing.

Turning again to the discharge pipe 29 from the entraining motor 21—22 it is observed that this pipe has two branches 29a and 29b. The latter of these branches is extended to a pilot device 32 which, under certain conditions not necessary to be described for an understanding of this particuar invention, provides for additional flow of air through the pipe 33, through the timing reservoir 34 and pipe 35 to the booster cylinder cocks 36.

In accordance with this invention, the branch pipe 29a is extended into a valve device 37, this device being illustrated in detail in Figure 3. As here shown air coming in through the connection 29a enters chamber 38 and, when valve member 39 is open, passes beyond this valve to the chamber 41. A spring 40 is associated with this valve and urges the valve to its closed position when such movement is permitted by the associated control. The chamber 41 of this valve device is coupled by means of the connection 42 with an air control valve 43 which is shown in detail in Figure 4.

For reasons which will appear more fully hereinafter, the valve device 37 has an additional valve member 44 controlling communication between the chamber 41 and a third chamber 45 arranged for communication with the atmosphere through the port 46. The actuating mechanism for the valves 39 and 44 includes a stem member 47 having a plunger 48 at one end thereof projecting externally of the device. A plunger 49 retained in its upper position by spring 50 contacts with a lower portion of the valve 44 and controls movements of both of the valves therethrough.

As seen in Figure 1 the valve device 37 is equipped with a rocker member 51 pivoted as at 52 and carrying a roller 53 adapted to ride on and off the cam surface 54 formed on or movable with the main throttle valve operating rod 8, it being noted at this point that the cam 54 and the roller 53 are so relatively proportioned and arranged as to provide for movement of the plunger 48 upwardly, as by means of the abutment 55, at all times when the main throttle is open; this, in turn, serving to maintain valve member 39 is open position and valve member 44 in closed position while the main throttle is open.

In connection with the foregoing it should be understood that the portion of the throttle operating rod 8 illustrated as being associated with the roller 53 of valve device 37 is actually a part of the main throttle actuating mechanism and is, of course, interposed between the portions of the throttle rod 8 which are shown broken away toward the top of Figure 1.

By reference now to Figure 4 it will be seen that air entering the device 43 through the connection 42 may normally pass beyond the valve member 56 to chamber 57, the latter communicating with connection 58 which is extended to the booster throttle operating motor 59.

This motor, as viewed in Figure 5, will be seen to include a piston 60 against the upper surface of which the incoming air is delivered so as to depress the piston against the pressure of spring 61 and thus cause a downward movement of the actuating connection 62. The actuating connection, in turn, is coupled to the valve rod 63 of the booster throttle valve 14 through suitable levers 64.

Turning once again to Figure 1 it is to be observed that an air supply line 65, communicating with the supply pipe 24, is extended to the valve mechanism 66, this mechanism being similar, at least in all essential respects, to the valve mechanism illustrated in detail in Figure 3. In this instance, however, the air passing through the valve 66 is delivered to a connection 67 extended to a lower portion of the air control valve 43, although it should be observed that this delivery is effected only upon actuation of the hand lever 66a to depress the plunger 66b. In the lower portion of this valve a piston 68 is arranged to reciprocate in the cylinder 69, and the air coming in through connection 67 is discharged into the chamber 70 to raise the piston and thus, through the actuating part 71 thereof, to lift valve member 72 from its seat and close valve member 56 on its seat against the pressure of spring 73. An additional coil spring 74 is preferably arranged internally of the piston 68 to ensure return movement thereof upon release of the pressure in the chamber 70. It will now be seen that upon such release any pressure remaining in the motor device 59 or in the connection 58 extended thereto may be exhausted into the chamber 57 and thence past the valve 72 to the atmosphere, through port 75.

Before considering the operation of certain portions of the slip control mechanism, the operation of the booster motor itself might, to advantage, briefly be reviewed. Upon actuation of the booster latch 26, the air is admitted to the entraining motor device 21—22 and at the same time to the valve 30 in order to open a supplementary steam supply and thus provide idling and proper entrainment of the booster gearing. After entrainment, the air, as above described, is by-passed from the entraining motor and, upon opening of the main locomotive throttle 6, the roller 53 of the control device 37 rides up on the cam 54 and thus permits passage of air from the pipe 29, through pipe 29a, to the connection 42. From this connection the air is conducted through the air control valve 43 to the actuating motor for the booster throttle with the result that the booster throttle is opened to permit the normal supply of steam to enter through the branch supply line 12. Thus the booster motor and the main cylinders of the locomotive are placed in operation.

Assume now that the main driving wheels of the locomotive slip as, for example, in making a difficult start. In order to correct for slipping, the engineer closes the throttle and as a result the roller 53 rides down off cam 54 and closes communication between the air lines 29a and 42. This, in turn, and also very rapidly, effects a closing movement of the booster throttle. By this quick or rapid closing of the booster throttle, a certain amount of steam is trapped in the booster supply line extended from the throttle to the cylinders, and even though the pressure in the main supply pipe (extending from the main throttle 6 to the cylinders 10) may drop materially, this drop will not, in any way, effect the booster.

Upon opening of the main throttle after the slipping has been stopped, the roller 53 of the control device 37 again rides up on cam 54 and almost instantaneously re-opens the booster throttle. I have found that, in normal operation, the interval of time during which the main throttle is closed to stop slipping of the main drivers is not of sufficient length to cause a pressure drop in the booster supply line which is sufficient to result in disentrainment of the gearing, provided the booster throttle is quickly closed in order to trap a certain amount of steam in the booster line.

With respect to this matter it should be borne in mind that unless the booster cylinders are delivering a fair amount of power, the idler gear will automatically be thrown out of mesh with the driven gear 16 under the influence of rotation of the axle 15. However, by trapping steam in the booster supply line in the manner above described, pressure sufficient to ensure entrainment will be maintained for the relatively short interval of time during which the main locomotive throttle will normally be closed to correct for slipping.

In addition to the foregoing and in order further to ensure maintenance of sufficient pressure to prevent disentrainment, the controlling system for the booster is so construced as to maintain the auxiliary steam supply through the idling supply line 31 even when the main locomotive throttle is closed. Thus, under all normal conditions, and even when the main throttle is closed for a more or less extended period of time to correct for slipping, the auxiliary or idling supply of steam together with the steam which is trapped in the booster supply line will be sufficient to prevent disentrainment of the booster gearing.

A further feature of importance of this invention resides in the combination, with the arrangements above described, of the booster slip control device 66. This device, as hereinbefore noted, provides for the passage of air from the supply pipe 24 to the piston 68 in the lower portion of the air control valve 43, and upon actuation of the hand lever 66a, the air admitted through the connections serves to close communication between the pipe 42 and the throttle actuating motor 59 and further, to open the pipe 59 and thus the interior of the motor cylinder to exhaust to the atmosphere through chamber 57, and beyond valve member 72 to the exhaust port 75.

Thus, in case the engineer desires to stop slipping of the booster motor, this may be done independently of the operation of the main drivers, it being noted that it is only necessary to momentarily depress the lever 66a in order quickly and effectively to shut off the supply of steam to the booster engine until such time as the slipping has stopped.

What I claim is:—

1. In a locomotive, the combination of a main engine cylinder, a booster motor arranged for entrainment and disentrainment with respect to the axle which it is adapted to drive, a main steam supply line for said cylinder and said motor, a main throttle valve for controlling passage of steam through said line, a booster throttle arranged in the steam supply line beyond said main throttle, controlling mechanism for the booster motor including entraining mechanism, supplemental steam supply means providing for idling of the motor, means for opening the booster throttle upon entrainment, and a mechanism for preventing disentrainment of the booster motor upon closure of the main throttle valve to stop slipping of the main drivers, the last mentioned mechanism being characterized by the inclusion of means operable upon closure of the main throttle for closing the booster throttle whereby the steam admitted through the supplemental supply means and the steam trapped in the booster steam line will provide sufficient driving torque to prevent disentrainment of the booster.

2. In a locomotive, the combination of a main engine cylinder, a booster motor arranged for entrainment and disentrainment with respect to the axle which it is adapted to drive, a main steam supply line for said cylinder and said motor, a main throttle valve for controlling passage of steam through said line, a booster throttle arranged in the steam supply line beyond said main throttle, controlling mechanism for the booster motor including entraining mechanism, supplemental steam supply means providing for idling of the motor, means for opening the booster throttle upon entrainment, and a mechanism for preventing disentrainment of the booster motor upon closure of the main throttle valve to stop slipping of the main drivers, the last mentioned mechanism being characterized by the inclusion of means operable upon closure of the main throttle for closing the booster throttle, whereby the steam admitted through the supplemental supply means and the steam trapped in the booster steam line will provide sufficient driving torque to prevent disentrainment of the booster, together with a mechanism for stopping slipping of the wheels driven by the booster motor including additional means for closing the booster throttle.

3. In a locomotive, the combination of a main engine, a booster motor, a main steam supply for said engine and said motor, a main throttle for controlling said supply, a booster throttle and a mechanism for preventing disentrainment of the booster motor upon closure of the main throttle to stop slipping of the main locomotive drivers, said mechanism including a device operable to close the booster throttle upon closure of the main throttle, whereby to trap steam in the booster suppply line extended from the booster motor to its throttle, together with means for stopping slipping of the wheels adapted to be driven by the booster motor including additional and manually controllable means for closing the booster throttle.

4. In a locomotive, the combination of a main engine cylinder, a booster motor arranged for operative entrainment and disentrainment with respect to a wheeled axle, the booster motor being so constructed as to become automatically disentrained when the driving power of the motor falls below a predetermined point, a main steam supply line for said cylinder and said motor, a main throttle for said line, a booster motor throttle, and a controlling mechanism for the operation of the booster motor including a fluid pressure operated motor device for effecting entrainment, supplemental booster steam supply means adapted to deliver sufficient steam to the motor to effect idling thereof, means for opening the booster throttle upon entrainment including a fluid pressure motor device and a fluid pressure line extended therefrom to said entraining motor to receive operating fluid from the latter, and a valve device in said line associated with said main throttle to be opened during opening movement of the main throttle and closed upon closure thereof, whereby upon closure of the main throttle to stop slipping of the main locomotive drivers, the steam supplied through said supplemental supply means and the steam trapped in the booster supply line beyond the booster throttle will serve to maintain sufficient driving power in the booster motor to prevent disentrainment thereof.

5. In a locomotive, the combination of a main engine cylinder, a booster motor arranged for operative entrainment and disentrainment with respect to a wheeled axle, the booster motor being so constructed as to become automatically disentrained when the driving power of the motor falls below a predetermined point, a main steam supply line for said cylinder and said motor, a main throttle for said line, a booster motor throttle, and a controlling mechanism for the operation of the booster motor including a fluid pressure operated motor device for effecting entrainment, supplemental booster steam supply means adapted to deliver sufficient steam to the motor to effect idling thereof, means for opening the booster throttle upon entrainment including a fluid pressure motor device and a fluid pressure line extended therefrom to said entraining motor to receive operating fluid from the latter, and a valve device in said line associated with said main throttle to be opened during opening movement of the main throttle and closed upon closure thereof, whereby upon closure of the main throttle to stop slipping of the main locomotive drivers, the steam supplied through said supplemental supply means and the steam trapped in the booster supply line beyond the booster throttle will serve to maintain sufficient driving power in the booster motor to prevent disentrainment thereof, together with means for stopping slipping of the wheels adapted to be driven by the booster motor, such means including a manually controllable device for blocking fluid pressure in the said line.

6. In a locomotive, the combination of a main engine, a booster motor, a main steam supply for said engine and said motor, a main throttle for controlling said supply with actuating mechanism therefor, a booster throttle and a mechanism for preventing disentrainment of the booster motor upon closure of the main throttle to stop slipping of the main locomotive drivers, said mechanism including a fluid pressure operated booster throttle actuating motor, a fluid pressure line for said motor, and a valve in said line operatively associated with said actuating mechanism and arranged to be closed upon closure of the main throttle, together with manually operable quick action means associated with said fluid pressure line for the booster motor for effecting closure of the booster throttle.

7. In a locomotive, the combination of a main engine, a booster motor, steam supply connections for the engine and the motor, a main throttle valve controlling the flow of steam to the main engine, actuating mechanism for said throttle valve, a valve for controlling flow of steam to the booster motor, and a controlling mechanism for the valve last mentioned including means operatively associated with the actuating mechanism for the main throttle valve and adapted to provide closing of the valve for controlling the booster steam supply upon closure of the main throttle valve, together with additional means for effecting closure of the booster controlling valve including a manually operable quick action device.

8. In a locomotive, a main engine, a main steam supply line extended to said engine, a main throttle valve in said line, a booster motor arranged for entrainment and disentrainment with respect to an axle of the locomotive, a booster steam supply line communicating with the main steam supply line beyond the main throttle, a booster throttle in the booster supply line, and a controlling system for the booster steam supply and throttle arranged to maintain booster entrainment during momentary closure of the booster throttle, means for effecting closure of the booster throttle upon closure of the main throttle, and additional means for closing the booster throttle including a manually operable quick action device.

MONTAGUE H. ROBERTS.